United States Patent
Bender et al.

(10) Patent No.: US 7,039,952 B2
(45) Date of Patent: May 2, 2006

(54) USING PATTERNS TO PERFORM PERSONAL IDENTIFICATION DATA SUBSTITUTION

(75) Inventors: Michael S. Bender, Boulder Creek, CA (US); Fabio Pistolesi, Biviers (FR)

(73) Assignee: Sun Microsystems, Inc., Santa Clara, CA (US)

( * ) Notice: Subject to any disclaimer, the term of this patent is extended or adjusted under 35 U.S.C. 154(b) by 815 days.

(21) Appl. No.: 09/861,062

(22) Filed: May 18, 2001

(65) Prior Publication Data

US 2003/0046573 A1    Mar. 6, 2003

(51) Int. Cl.
G06F 12/00    (2006.01)
G06F 13/12    (2006.01)
G06K 19/73    (2006.01)

(52) U.S. Cl. .......................... 726/9; 235/492; 711/163
(58) Field of Classification Search ................ 713/155, 713/184, 185, 186; 726/9
See application file for complete search history.

(56) References Cited

U.S. PATENT DOCUMENTS 6,005,942 A * 12/1999 Chan et al. ................. 713/187
6,151,647 A * 11/2000 Sarat .......................... 710/301
6,181,735 B1 * 1/2001 Sarat .......................... 375/222

OTHER PUBLICATIONS

Daou Systems Inc., "Thin Client Technology," Technical Overview, Apr. 2001.*
Microsoft Inc., "Smart Cards," White Paper, 1999.*

* cited by examiner

Primary Examiner—Gregory Morse
Assistant Examiner—Matthew Heneghan
(74) Attorney, Agent, or Firm—Martine Penilla & Gencarella, LLP

(57) ABSTRACT

The present invention is directed toward using patterns in APDU to perform identification data substitution. According to one or more embodiments of the present invention, a user inserts a smart card into a card reader connected to a client computing device. Then, the user enters a PIN. The PIN is embedded into an APDU which is sent to the card reader and is presented to the smart card. The APDU contains special patterns that specify to the card reader where and in what format the PIN should be embedded into a prototype APDU that is constructed in the card reader and presented to the card for verification.

21 Claims, 11 Drawing Sheets

HID

HID Single Chip Implementation

USING PATTERNS TO PERFORM PERSONAL IDENTIFICATION DATA SUBSTITUTION

BACKGROUND OF THE INVENTION

1. Field of the Invention

The present invention relates to network security. More specifically, the invention relates to using patterns to perform identification data substitution.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

When logging in to a distributed network of computing devices, it is typical for a security measure to be in place which insures the identity of the individual logging in. One manner where this occurs is on a system that uses a smart card. The user inserts the card into a card reading device attached to the computing system and enters a personal identification number (PIN) onto a keyboard or other input device of the computing system. Alternatively, the user might provide biometric identification to the system in the form of a fingerprint or retinal scan. If the identification data is authenticated then the user logs in and begins using the distributed network.

As will be further explained below, the manner in which identification data (such as PINs or biometric identifiers) is currently authenticated is vulnerable to snooping attacks from untrusted third parties that might use the data to compromise the network. Before further describing the problems associated with current techniques which authenticate identification data, an example computing environment where this problem occurs is describe below.

Multi-Tier Application Architecture

In the multi-tier application architecture, a client communicates requests to a server for data, software and services, for example, and the server responds to the requests. The server's response may entail communication with a database management system for the storage and retrieval of data. The multi-tier architecture includes at least a database tier that includes a database server, an application tier that includes an application server and application logic (i.e., software application programs, functions, etc.), and a client tier. The application server responds to application requests received from the client. The application server forwards data requests to the database server.

FIG. 1 provides an overview of a multi-tier architecture. Client tier 100 typically consists of a computer system that provides a graphic user interface (GUI) generated by a client 110, such as a browser or other user interface application. Conventional browsers include Internet Explorer and Netscape Navigator, among others. Client 110 generates a display from, for example, a specification of GUI elements (e.g., a file containing input, form, and text elements defined using the Hypertext Markup Language (HTML)) and/or from an applet (i.e., a program such as a program written using the Java™ programming language, or other platform independent programming language, that runs when it is loaded by the browser).

Further application functionality is provided by application logic managed by application server 120 in application tier 130. The apportionment of application functionality between client tier 100 and application tier 130 is dependent upon whether a "thin client" or "thick client" topology is desired. In a thin client topology, the client tier (i.e., the end user's computer) is used primarily to display output and obtain input, while the computing takes place in other tiers. A thick client topology, on the other hand, uses a more conventional general purpose computer having processing, memory, and data storage abilities. Database tier 140 contains the data that is accessed by the application logic in application tier 130. Database server 150 manages the data, its structure and the operations that can be performed on the data and/or its structure.

Application server 120 can include applications such as a corporation's scheduling, accounting, personnel and payroll applications, for example. Application server 120 manages requests for the applications that are stored therein. Application server 120 can also manage the storage and dissemination of production versions of application logic. Database server 150 manages the database(s) that manage data for applications. Database server 10 responds to requests to access the scheduling, accounting, personnel and payroll applications' data, for example.

Connection 160 is used to transmit data between client tier 100 and application tier 130, and may also be used to transfer the application logic to client tier 100. The client tier can communicate with the application tier via, for example, a Remote Method Invocator (RMI) application programming interface (API) available from Sun Microsystems™. The RMI API provides the ability to invoke methods, or software modules, that reside on another computer system. Parameters are packaged and unpackaged for transmittal to and from the client tier. Connection 170 between application server 120 and database server 150 represents the transmission of requests for data and the responses to such requests from applications that reside in application server 120.

Elements of the client tier, application tier and database tier (e.g., client 10, application server 120 and database server 150) may execute within a single computer. However, in a typical system, elements of the client tier, application tier and database tier may execute within separate computers interconnected over a network such as a LAN (local area network) or WAN (wide area network).

Security Measures

Smart cards and other identification techniques are used in environments like the multi-tier application architecture as a security measure to insure of the user when he/she logs into a computing device on the client tier. Once identified, data on the database tier and applications on the application tier may be used. One advantage associated with using a smart card or other identification technique is that no matter where the computing device is located on the client tier, the same data and applications that the user needs, or was using before his/her last log-off, can be retrieved.

In many cases, the identification technique involves the presentation of a secret that only the cardholder knows. Sometimes this secret is called a PIN. Since the smart card itself has no mechanism for interacting with a human being (i.e., no keyboard or display), it requires the system it is being used with to provide the human I/O facilities to prompt the cardholder for a PIN and to accept the cardholder's input of the PIN, typically on a keyboard or other suitable input device.

Application Protocol Data Units (APDU)

Application communicate with smart cards using a data encapsulation protocol called APDU. The format of an APDU is described in the ISO standards document ISO-7816. In general, an APDU comprises a header, instructions that tell the smart card what to do, and information regarding whether data is supposed to be returned. A PIN is generally presented to the smart card as a part of an APDU transaction. The PIN is embedded in the APDU in a format that the card understands. By understanding the format, the card is able to verify the PIN and can perform some function for the user, such as releasing data out of the smart card or otherwise performing a calculation for the user.

Since the PIN is a very sensitive piece of information that is ideally known only by the cardholder, the PIN must be protected from interception. One solution is to provide a smart card reader with a built in key pad used to enter the PIN. The PIN is retained inside he reader for the duration of the transaction required to format an APDU with the PIN embedded in it and to send that APDU to the smart card. This solution, however, only solves part of the problem. In particular, it does not permit an application executing outside of the card reader to send an APDU to the reader that the smart card requires for presentation of the PIN, without actually specifying the PIN itself in the APDU. This is disadvantageous because specifying the PIN itself makes it vulnerable to interception. In addition, there are multiple types of smart card families, and each requires presentation of the PIN in a different manner, which makes compatibility difficult.

SUMMARY OF THE INVENTION

The present invention is directed toward using patterns in APDU to perform identification data substitution. According to one embodiment of the present invention, a user inserts a smart card into a card reader connected to a client computing device. Then, the client device constructs an APDU by removing the portions in the APDU where the PIN goes and replacing those portions with patterns.

Next, the user enters a PIN to the card reading device when prompted. The PIN is embedded into a new APDU constructed by the card reading device by using the patterns and replacing them with the actual PIN. The new APDU is then presented to the smart card where it can be verified without ever being sent from the application to the card reader where it might be compromised.

In one embodiment, a generic application executing outside the card reader is used to construct an APDU by locating the areas in the APDU where the PIN goes and substituting a pattern there. In one embodiment, the pattern comprises an instruction telling the card reader to put the APDU in most significant bytes first. In another embodiment, the pattern comprises an instruction telling the card reader to put the APDU in ASCII versus binary.

The APDU is then sent to the reader, where the reader itself prompts the user for entry of the PIN and verifies the PIN by applying it to the original APDU having the patterns. Using the APDU with patterns and the PIN, a new prototype APDU is constructed inside the card reader and presented to the smart card. In one embodiment, the invention is applied to other verification techniques, such as biometric identification, where the biometric data is transformed into digital information and embedded into the APDU as well.

BRIEF DESCRIPTION OF THE DRAWINGS

These and other features, aspects and advantages of the present invention will become better understood with regard to the following description, appended claims and accompanying drawings where:

FIG. 6 shows an example of a thin client topology called a virtual desktop system architecture.

DETAILED DESCRIPTION OF THE INVENTION

The invention relates to using patterns in APDU to perform identification, data substitution. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

APDU Patterns

Figure 1:
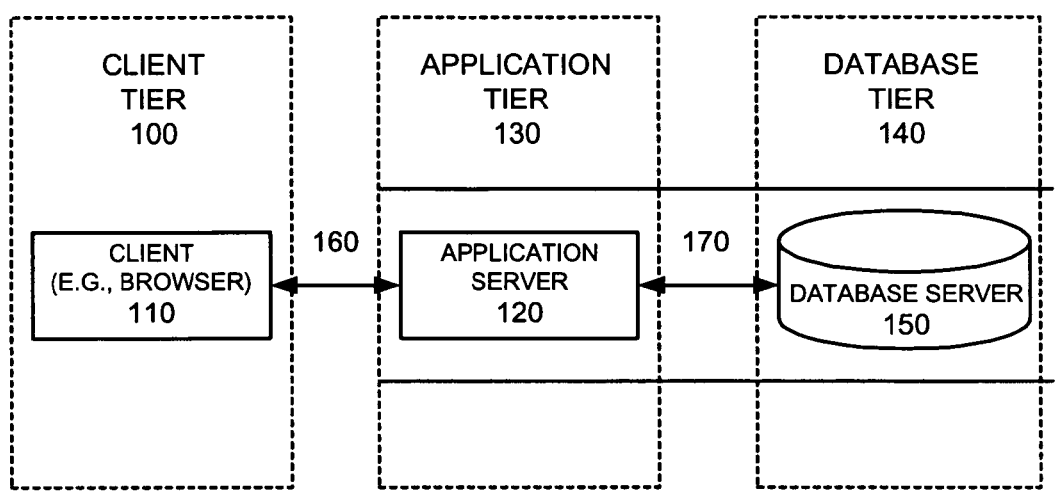
FIG. 1 shows an example of a multi-tier application architecture.
Figure 2:
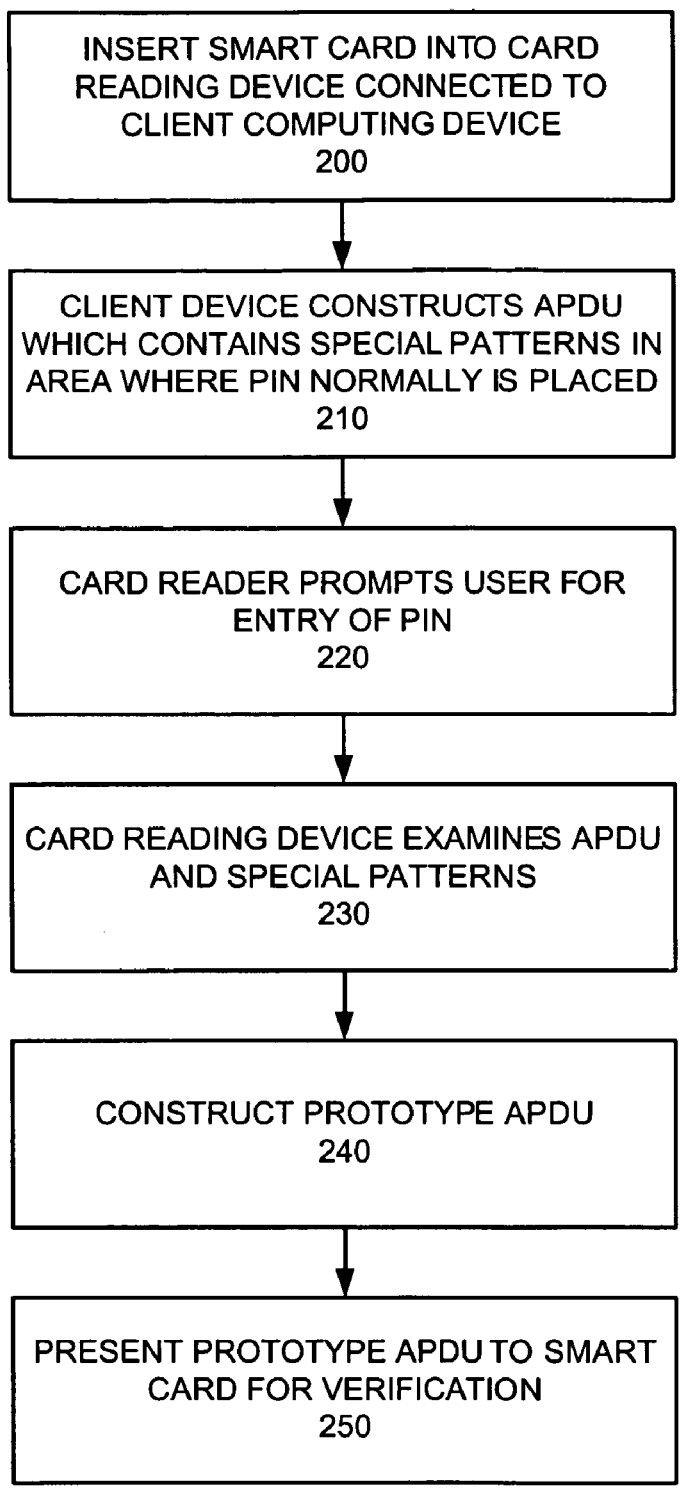
FIG. 2 shows the use of patterns in APDU to perform identification data substitution according to an embodiment of the present invention.

One embodiment of the present invention is shown in FIG. 2. At step 200 a user inserts a smart card into a card reader connected to a client computing device. The client computing device may be a general purpose computer, a thin-client computing device, a personal digital assistant, or any other computing device that may be coupled to a card reader an exchange information to and from the card reader. The client device constructs an APDU at step 210.

The APDU contains special patterns where the identification data is normally embedded. The patterns specify to the card reader where and in what format the PIN should be embedded into a prototype APDU that the card reader constructs. At step 220, the card reader prompts the user for entry of the PIN. At step 230, the APDU is examined by the card reading device for the special patterns. At step 240, the prototype APDU is constructed by replacing the PIN in the areas where the patterns existed in the old APDU, and the new APDU is presented to the smart card for verification at step 250.

Generic Application

Figure 3:
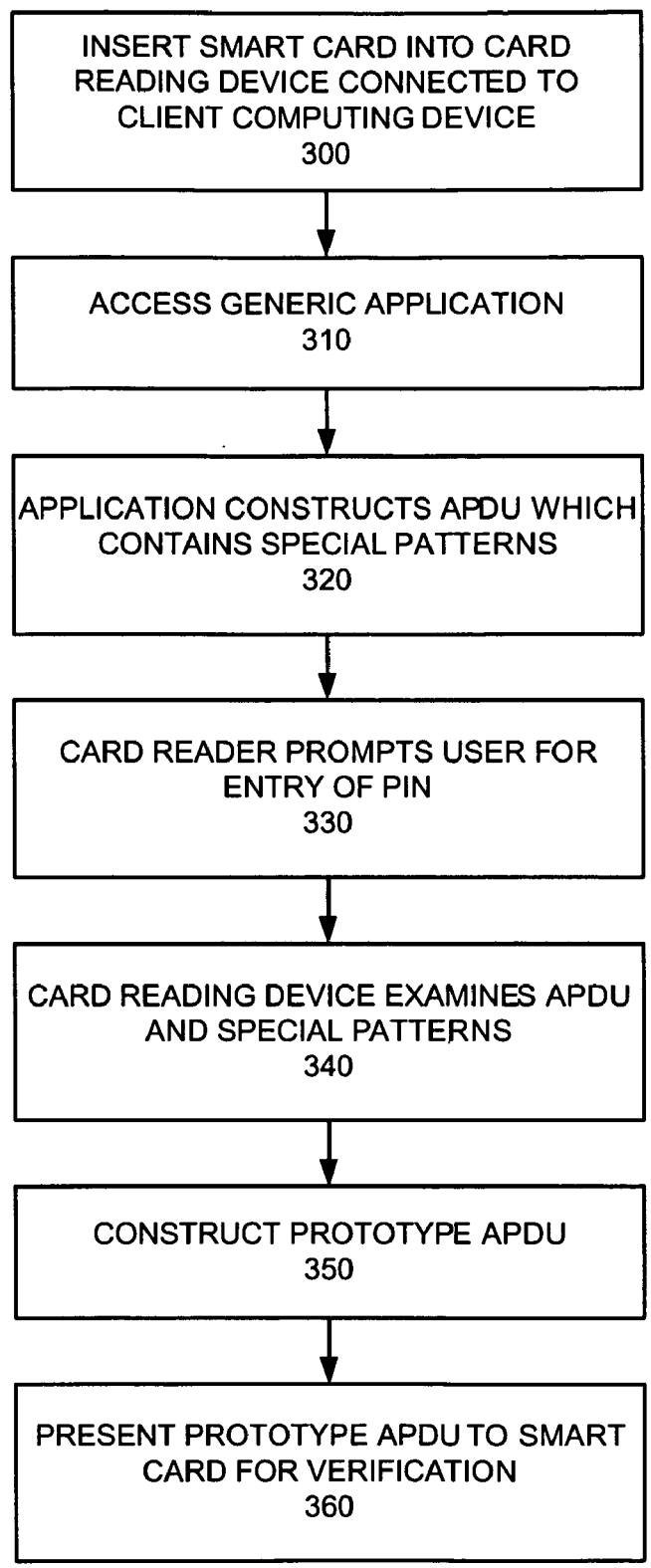
FIG. 3 shows the use of patterns in APDU to perform identification data substitution according to another embodiment of the present invention.

Another embodiment of the present invention allows a generic application to interface with the card reader. A generic application is a computer program that executes outside the smart card reader and interfaces with the card reader in a secure manner. This embodiment is shown in FIG. 3. At step 300 a user inserts a smart card into a card reader connected to a client computing device. Then, the user accesses a generic application at step 310 which constructs an APDU at step 320 which contains the special patterns where the PIN normally goes. At step 330, the card reader prompts the user for entry of the PIN. At step 340, the APDU is examined by the card reading device for the special patterns. At step 350, a prototype APDU is constructed by replacing the PIN in the areas where the patterns existed in the old APDU, and the new APDU is presented to the smart card for verification at step 360.

Figure 4:
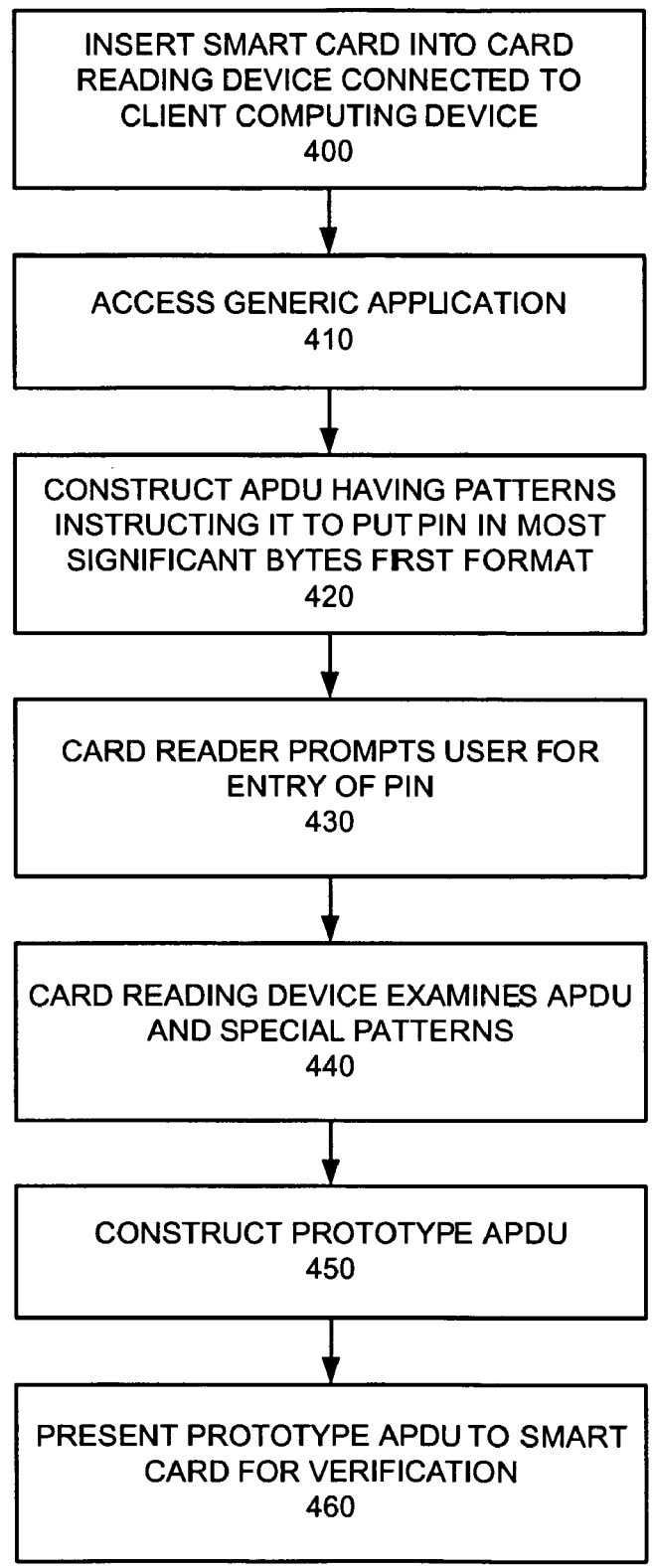
FIG. 4 shows the use of patterns in APDU to perform identification data substitution according to another embodiment of the present invention.

Another embodiment of the present invention is shown in FIG. 4. At step 400 a user inserts a smart card into a card reader connected to a client computing device. Then, the user accesses a generic application at step 410 which constructs an APDU at step 420 which contains special patterns with instructions telling the reader to put the prototype APDU in most significant bytes first. At step 430, the card reader prompts the user for entry of the PIN. At step 440, the APDU is examined by the card reading device for the special patterns. At step 450, a prototype APDU is constructed by replacing the PIN in the areas where the patterns existed in the old APDU, and the new APDU is presented to the smart card for verification at step 460.

Figure 5:
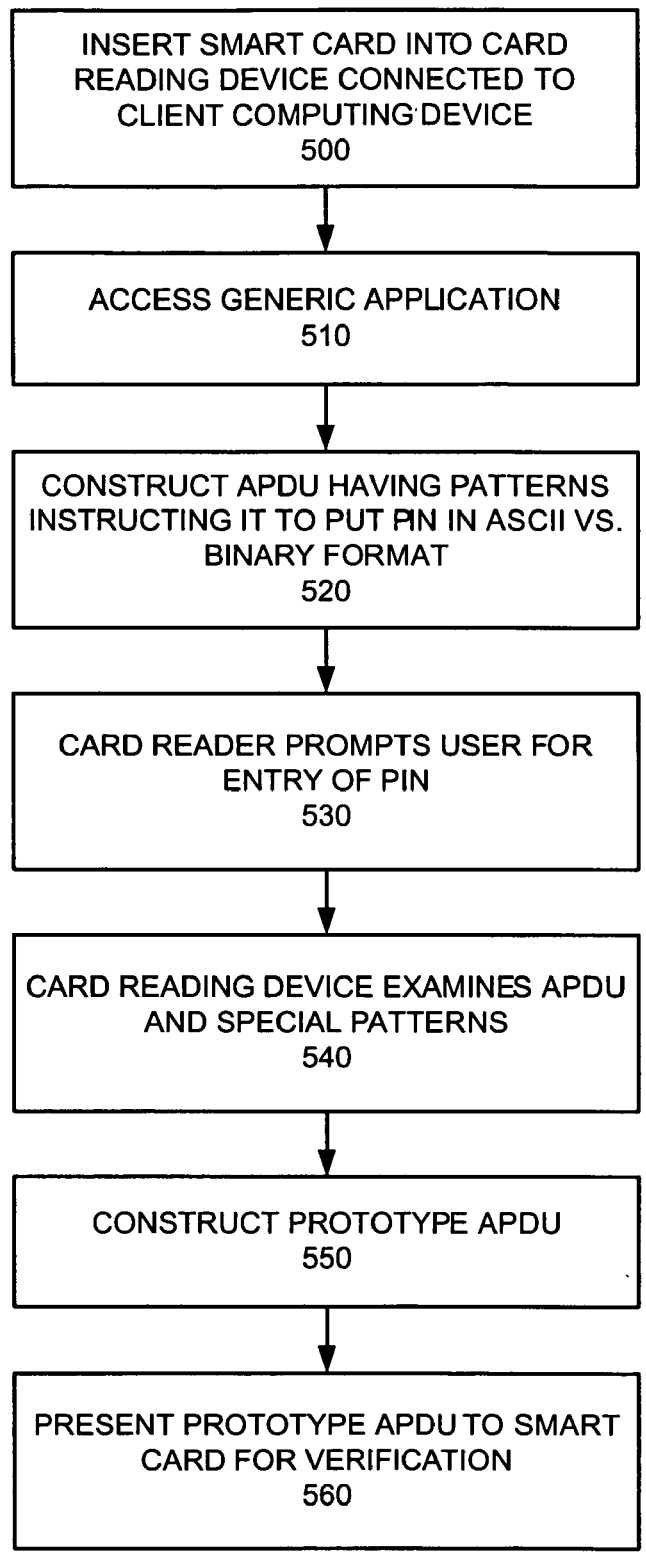
FIG. 5 shows the use of patterns in APDU to perform identification data substitution according to another embodiment of the present invention.

Another embodiment of the present invention is shown in FIG. 5. At step 500 a user inserts a smart card into a card reader connected to a client computing device. Then, the user accesses a generic application at step 510 which constructs an APDU at step 520 which contains special patterns with instructions telling the reader to put the prototype APDU in ASCII versus binary. At step 530, the card reader prompts the user for entry of the PIN. At step 540, the APDU is examined by the card reading device for the special patterns. At step 550, a prototype APDU is constructed by replacing the PIN in the areas where the patterns existed in the old APDU, and the new APDU is presented to the smart card for verification at step 560.

Biometric Identification

Figure 11:
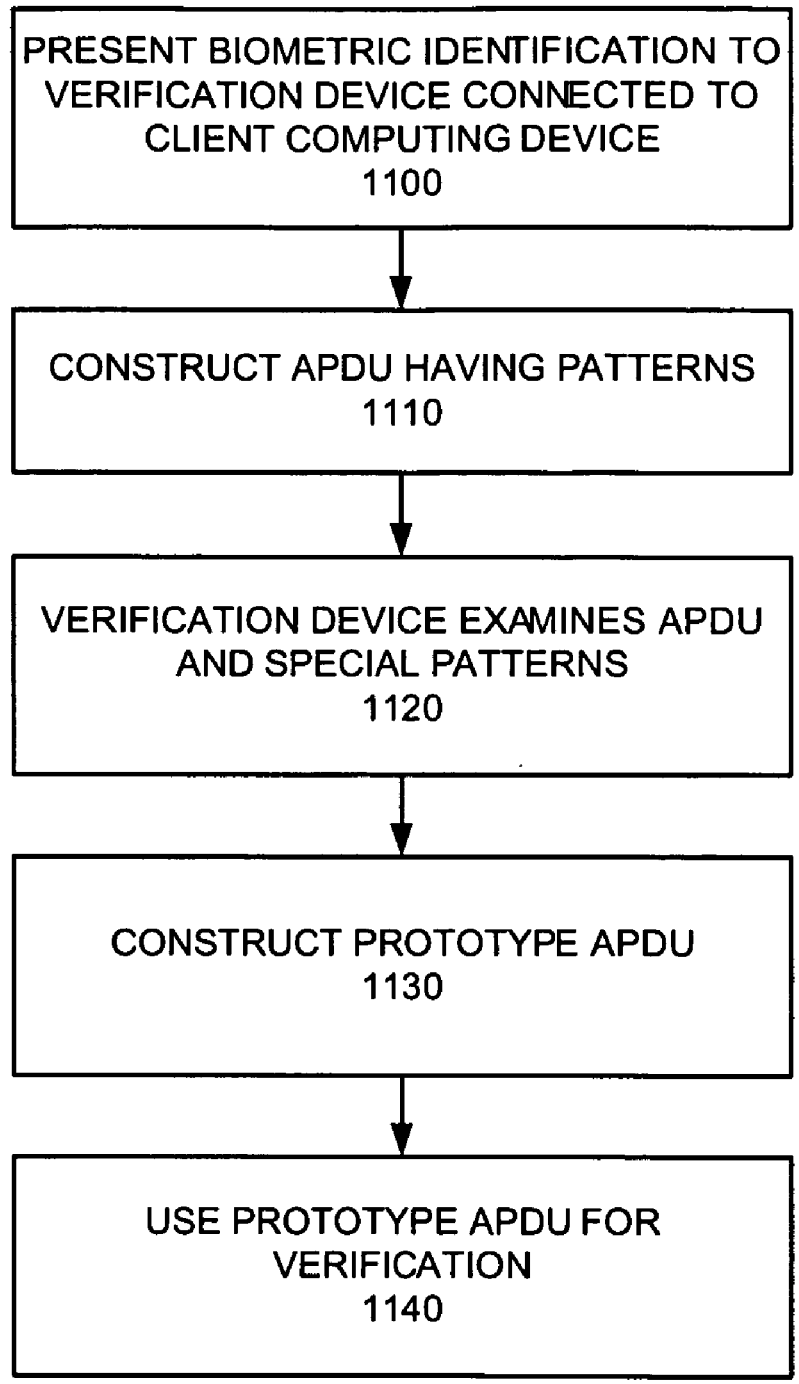
FIG. 11 shows the use of patterns in APDU to perform identification data substitution according to another embodiment of the present invention.

One embodiment of the present invention uses a biometric identification as the form of identification data. This embodiment is shown in FIG. 11. At step 1100 a user presents a biometric form of identification to a verification device connected to the client computing device. The biometric identification may be a fingerprint, a retinal scan, a voice identification, or other technique. The client device constructs an APDU at step 1110. The APDU contains special patterns where the identification data is normally embedded. At step 1120, the APDU is examined by the verification device for the special patterns. At step 1130, the prototype APDU is constructed by replacing the PIN in the areas where the patterns existed in the old APDU, and the new APDU is verified at step 1140.

Smart Card Architecture

Figure 6:
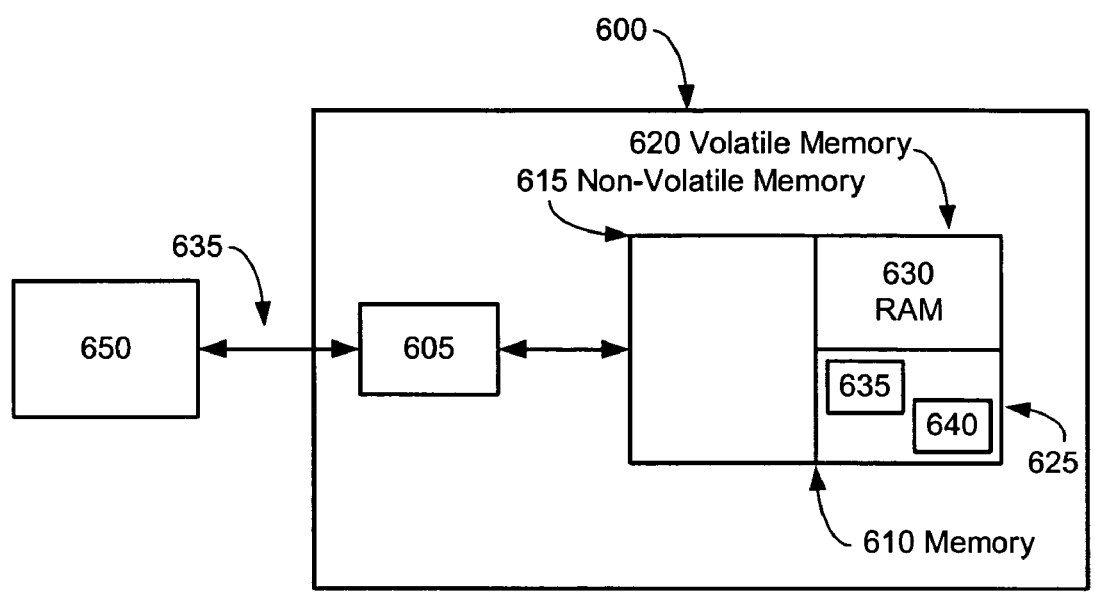
FIG. 6 shows an example of a smart card architecture.

FIG. 6 shows the architecture of one embodiment of a smart card that may be used with the present invention. The smart card 600 has a processor 605. This processor may be of limited capacity, such as an 8-bit processor, since the smart card's computational power is typically limited. The smart card has a memory 610 coupled to the processor which is divided up into non-volatile memory 615 and volatile memory 620. The volatile memory is further divided into EEPROM 625 and RAM 630. The EEPROM contains the operating program for the smart card 635 and other code 650, such as the code necessary to encrypt data and so on.

In one embodiment, the smart card has the ability to have software downloaded into its non-volatile memory where it can execute the program by moving it to RAM where the smart card will act according to the instructions of the computer software. The smart card further has a communications channel 635 between the processor and an external source 650 such as a host computer, for instance, to receive an APDU from a smart card reader.

The processor in the smart card is configured to retain information within the smart card that is secret. For instance, a secret key in the smart card will never be divulged cross the communications channel 635. The smart card will, however, allow information to come in across the communication channel and use the data. For instance, the smart card is configured to receive data from an external source across the communications channel, to use the secret key in the smart card, for example to sign and encrypt the incoming data, and to send the results out along the communications channel 635 to the external source 640.

Virtual Desktop System Architecture

Figure 7:
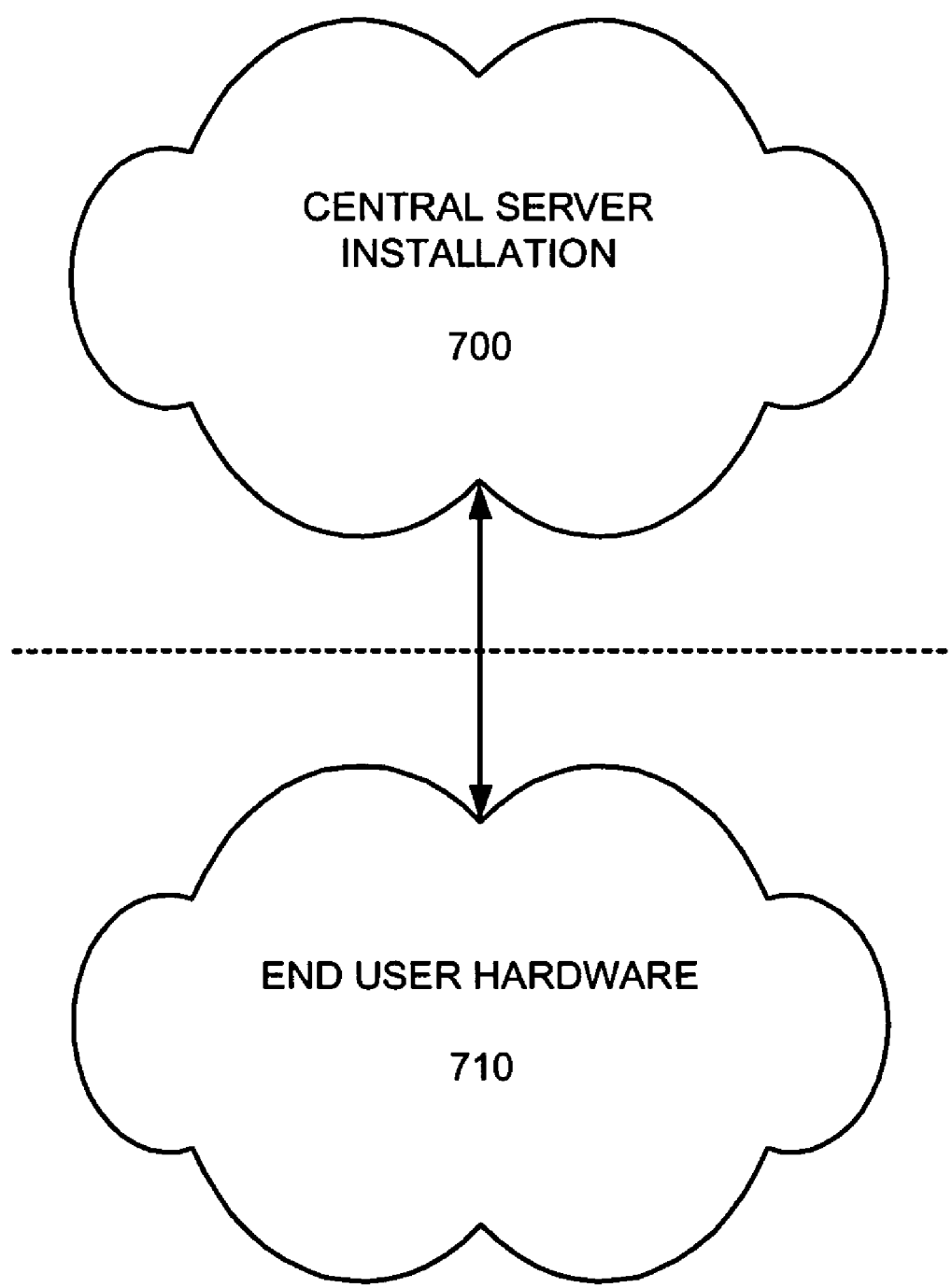

FIG. 7 shows an example of a thin client topology called a virtual desktop system architecture. The virtual desktop system architecture provides a re-partitioning of functionality between a central server installation 700 and end user hardware 710. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 8:
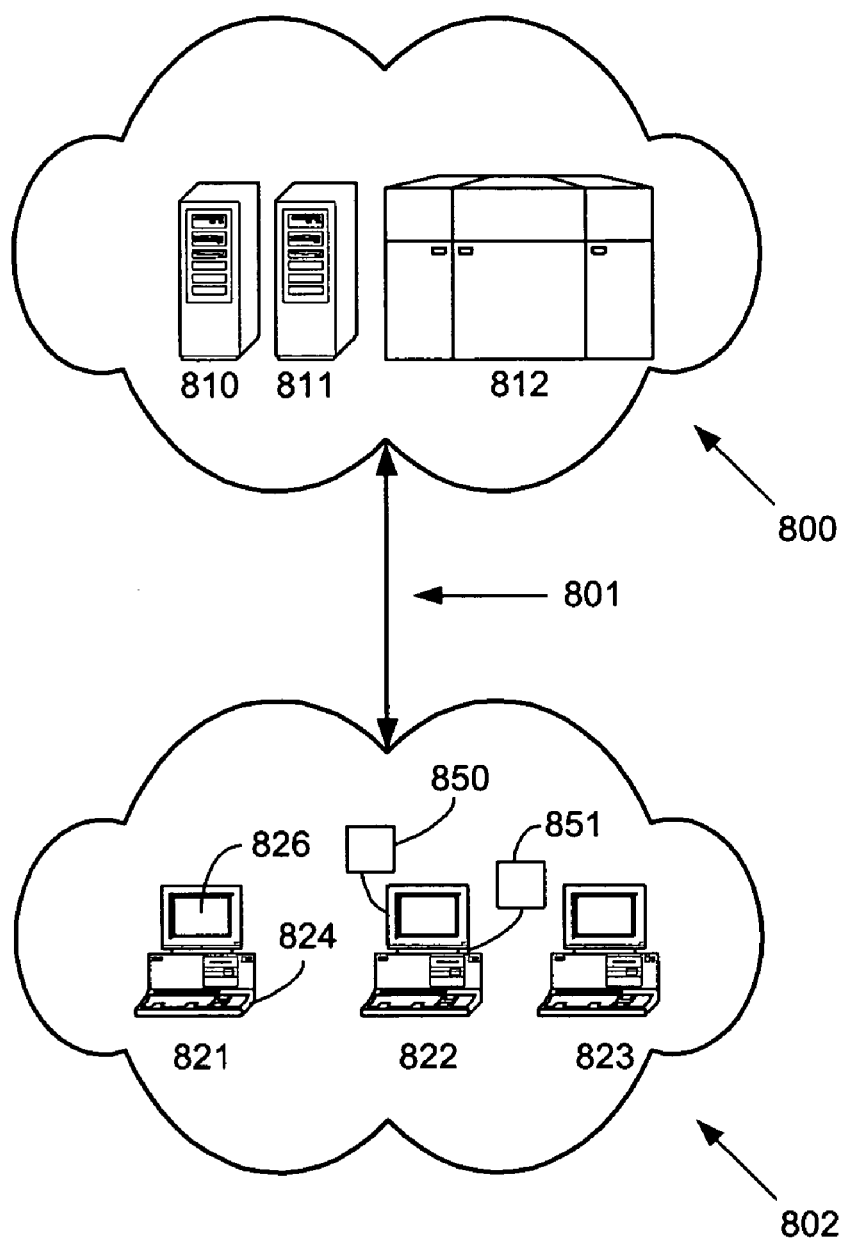
FIG. 8 displays the partitioning of the functionality of the virtual desktop system architecture.

The functionality of the virtual desktop system is partitioned between a display and input device such as a remote system and associated display device, and data sources or services such as a host system interconnected to the remote system via a communication link. The display and input device is a human interface device (HID). The system is partitioned such that state and computation functions have been removed from the HID and reside on data sources or services. One or more services communicate with one or more HIDs through a communication link such as network. An example of such a system is illustrated in FIG. 8, wherein the system comprises computational service providers 800 communicating data through communication link 801 to HIDs 802.

The computational power and state maintenance are provided by the service providers or services. The services are not tied to a specific computer, but may be distributed over one or more traditional desktop systems such as described in connection with FIG. 8, or with traditional servers. One computer may have one or more services, or a service may be implemented by one or more computers. The service provides computation, state and data to HIDs and the service is under the control of a common authority or manager. In FIG. 8, the services are provided by computers 810, 811, and 812. In addition to the service, a central data source can provide data to the HIDs from an external source such as for example the Internet or world wide web. The data source can also be broadcast entities such as those that broadcast data (e.g., television and radio signals).

Examples of services include X11/Unix services, archived or live audio or video services, Windows NT service, Java™ program execution service and others. A service herein is a process that provides output data and response to user requests and input. The service handles communication with an HID currently used by a user to access the service. This Includes taking the output from the computational service and converting it to a standard protocol for the HID. The data protocol conversion is handled by a middleware layer, such as the X11 server, the Microsoft Windows interface, video format transcoder, the OpenGL® interface, or a variant of the java.awt.graphics class within the service producer machine. The service machine handles the translation to and from a virtual desktop architecture wire protocol described further below.

Each service is provided by a computing device optimized for its performance. For example, a machine, such as an Enterprise class machine, may be used to provide X11/Unix service, a Sun MediaCenter™ may be used to provide video service, a Hydra based NT machine may provide applet program execution services. The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the world wide web, and others. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to completing) network traffic. Dedicated or shared communications interconnects maybe used in the present invention.

The HID is the means by which users access the computational services provided by the services. FIG. 8 illustrates HIDs 821, 822 and 823. Each HID comprises a display 826, a keyboard 824, mouse 851, and audio speakers 850. The HID includes the electronics need to interface these devices to the interconnection fabric and to transmit to and receive data from the services.

Figure 9:
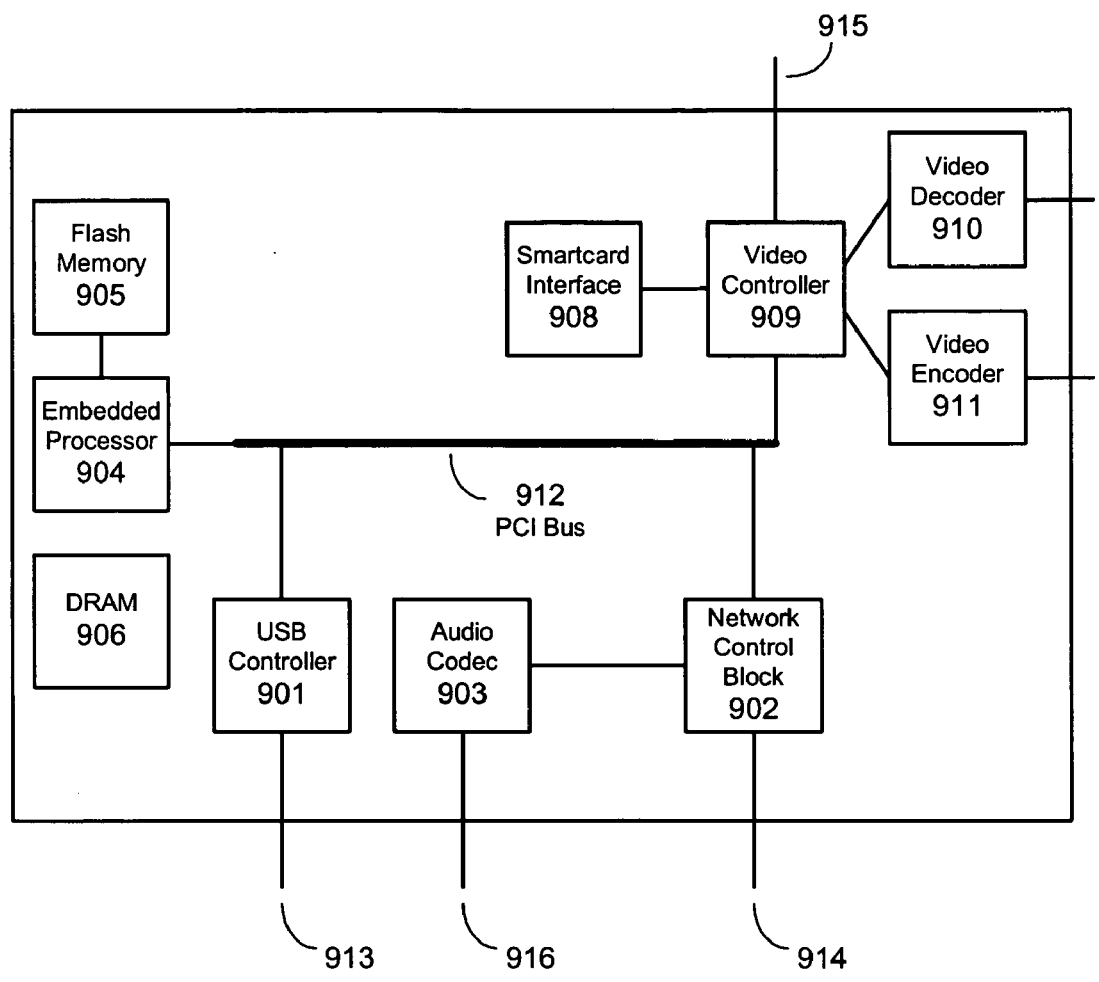
FIG. 9 is a block diagram of an example embodiment of a human interface device.

A block diagram of an example embodiment of the HID is illustrated in FIG. 9. The components of the HID are coupled internally to a bus 912. Network control block 902 communicates to the interconnect fabric, such as an Ethernet, through line 914. An audio codec 903 receives audio data on interface 916 and is coupled to network control block 902. Universal serial bus (USB) data communication is provided on lines 913 to a USB controller 901. The HID further comprises a embedded processor 904 such as a Sparc2ep processor with coupled flash memory 905 and dynamic random access memory (DRAM) 906. The USB controller 901, the network control block 902 and the embedded processor 904 are all coupled to the internal bus 912. A video controller 909, also coupled to the internal bus 912, can include an ATI RagePro+ frame buffer controller which provides. Super video graphics array (SVGA) output on the line 915. National television standards committee (NTSC) data is provided in and out of the video controller through video decoder 910 and encoder 911 respectively. A smartcard interface 908 may also be coupled to the video controller 909.

Figure 10:
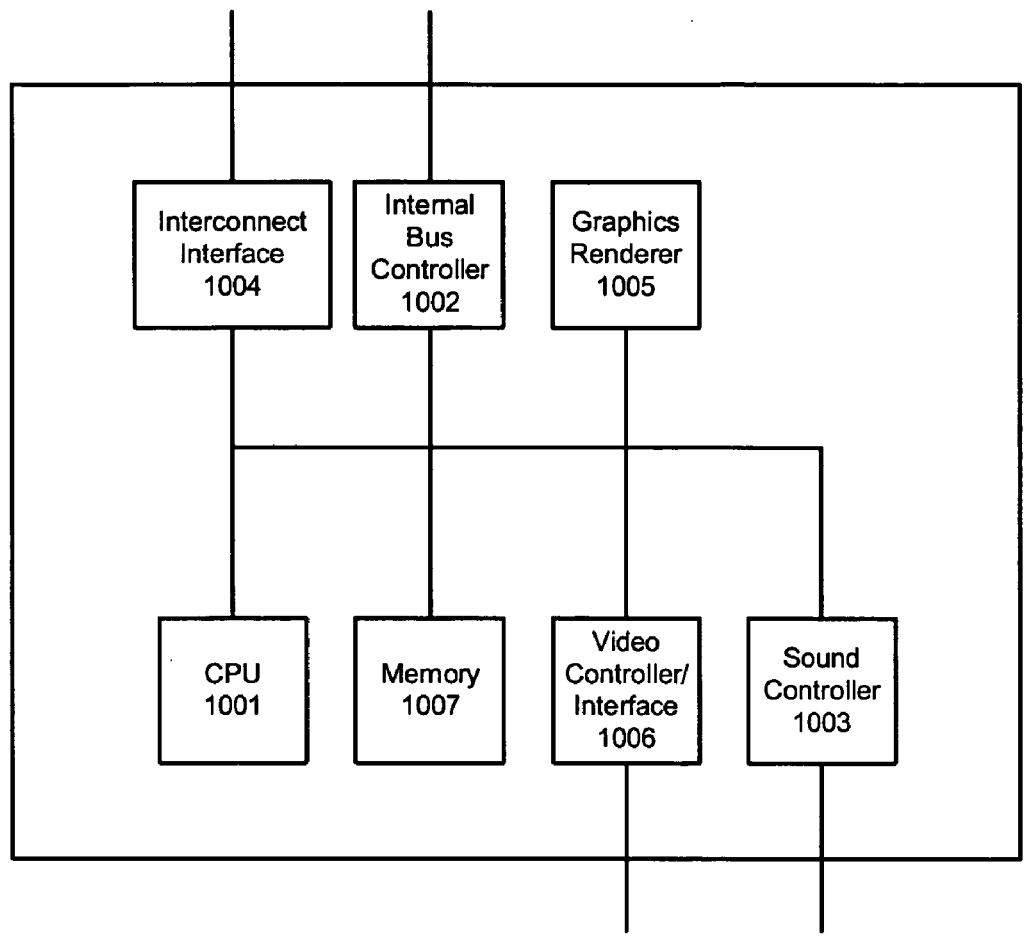
FIG. 10 is a block diagram of a single chip implementation of a human interface device.

Alternatively, the HID can comprise a single chip implementation as illustrated in FIG. 10. The single chip includes the necessary processing capability implemented via CPU 1001 and graphics renderer 1005. Chip memory 1007 is provided, along with video controller/interface 1006. Universal serial bus (USB) controller 1002 is provided to permit communication to a mouse, keyboard and other local devices attached to the HID. A sound controller 1003 and interconnect interface 1004 are also provided. The video interface shares memory 1007 with the CPU 1001 and graphics renderer 1005. The software used in this embodiment may reside locally in non-volatile memory or it can be loaded through the interconnection interface when the device is powered.

The operation of the virtual desktop system architecture is described in co-pending U.S. patent application Ser. No. 09/063,335, filed Apr. 20, 1998, entitled "Method and Apparatus for Providing A Virtual Desktop System Architecture" and assigned to the present assignee, and incorporated herein by reference.

APDU Patterns Message Format

In one embodiment, a server issues a READ command to an SCbus drive in a desktop unit (DTU) or HID. One example of a message format for embedding PIN patterns obtained from the user during a PIN entry operation based on this command is shown below. In the example, the HexDump format is used. This format is a human readable 2 byte ASCII representation of 1 binary byte. Literally any of the 2 bytes concatenations generated by choosing two characters from the following:

'0', '1', '2', '3', '4', '5' '6', '7', '8', '9', '0', 'A', 'B', 'C', 'D', 'E', 'F'

Using this scheme, the decimal value 131 is represented as "59".

During PIN entry mode, a keytable mapping keys to ASCII characters should be downloaded sot that the three buffers available to applications will contain ASCII values for the PIN the use typed. The purpose of the ADPU message is to allow different PIN formats to be sent to smart cards in an application defined and flexible manner.

First, a command for exchanging an APDU is made. The command is:

CMD=APDU APDU=<. . . >FB=.

The argument to APDU=follows the HexDump format, with the exception of even length substrings consisting of one of the following REGEX:

pattern=$x$bufpat|$y$bufpat|$z$bufpat $x$bufpat=$(PX|PP)+$ $y$bufpat=$(PY|PP)+$ $z$bufpat=$(PZ|PP)+$ "PX"—substitutes bytes from buffer 0 in HexDump format.
"PY"—substitutes bytes from buffer 1 in HexDump format.
"PZ"—substitutes bytes from buffer 2 in HexDump format.
"PP"—substitutes the pad byte as defined by parameter FB.

A substring pattern is considered to be any chain of pairs that begins with 'P[XYZP]' and whose every other single character is still a 'P'.

The number of pairs "PX", "PY", "PZ" present in each pattern specifies how many bytes from the buffer and in which position they will be replaced. The first pair "P[XYZ]" determines the position of byte index zero in the buffer to be replaced. Subsequent pairs for the same buffer increase the index in the buffer. If the number of characters present in the buffer is smaller than the number of pairs "P[XYZ]", the remaining pairs in the pattern will be considered as "PP". Vice versa, substitution will occur only for those bytes as specified by the pattern.

Since there is no specific separator between patterns, if references to a buffer are intermixed with references to other buffers in the same substring, they will be considered as a continuation pattern for that buffer.

Another independent sequence has been defined consisting of the following character:

'L'—substitutes the length of the APDU. The sequence "LL" is admissable in an example embodiment.

Smart Card Reader Protocol

The protocol makes use of a device manager/remote device driver (DM/DD) layer as transport mechanism. When the host wants to communicate with the smartcard, the EXCHANGE primitive is used, and the transfer of data follows these rules:

a) Commands are specifed as "CMD=xxx" as header of the string.

b) All parameters, if any, follow in the string.

c) Each parameter is a key/value pair.

Not all operations are atomic, for example changing the PIN on a card could require asking for the old PIN, the new PIN and a second copy of the PIN as confirmation . Only if the two copies match will the APDU for writing the new PIN on the card be sent. All the while, the user may want to do other things. To address this, a small "language" is defined. All commands are atomically and sequentially executed, no two commands are in execution at the same time.

One feature is to type a PIN without sending it to the Host, but directly to the smartcard, in a sort of loopback mode. Again, this is not always possible right away, so we need a way to type a PIN and temporarily store it until it can be embedded in an APDU to the card. Some operations, like entering/exiting the loopback keyboard mode and downloading the keymaps, are accomplished via control callback.

Typical operation requires the service to enter secure mode, download a keytable, and operate. In case a keytable has not been specified, some commands cannot execute, notably READ, CMP, APDU. The latter is a special case, since an APDU could be sent to the card independently of Secure Mode. In that case the keytable error is generated when reference to a buffer is made in the APDU itself.

An LED near the smartcard reader will blink according to the following rules as described by the Sun Service Indicator Standard which covers user-visable indicators on Sun platforms:

No LED activity

There is no readable card in the reader.

Green LED blinking

While in Secure PIN Entry Mode the blink rate should be 3–5 Hertz at a 50% on, 50% off duty cycle for the duration that the mode is active.

While data is being exchanged with the card, the LED shall flash at a random or intermittent rate for no less than 1 full second with the LED ending in the lit state.

Green LED fully lit

The smart card has been read and is ready (i.e. The card is still able to be accessed).

There is another primitive available via RDD, CONTROL. This call is used to initiate/terminate Secure PIN Entry Mode, download the keytable and to signal cancellation of an operation.

For operations to be successfully carried on, the DM notification facilities are used to tell the DM service about card properties, keyboard attached to the unit and keypresses. These internal properties are embedded in a message in the format described below.

```
Key/value Description for EXCHANGE
    A sample transaction could be:
    Host                DTU
    "CMD=APDU APDU=00B0000008"
                            "RES=760833EF PB=60 STATUS=9000"
    (values random)
    Where I asked for a certain APDU to be sent to the card and the
    result is sent back along with the procedure bytes and status.
    All described parameter and return keys have a
    <Key>=<value> syntax.
    CMD=        Description and values
    APDU        Asks for a certain APDU to be sent to the card.
        Parameters:
            Key
            APDU        APDU's bytes as
            an HexDump string. Buffers are
                referred to by 'X' for buffer 0, 'Y' for buffer 1
                'Z' for buffer 2. Each buffer specification is
                prepended by 'P'. a byte specified as "PP" means
                a pad byte.
                For more information, see APDUpatterns.txt
                'L' means substitute the apdu lenght.
            This pair is mandatory.
            FP      specifies in HexDump format the byte to use as pad
            This pair is optional.
        Returns:
            Key
            RES     the hexdump bytes from the card
            PB      procedure bytes
            STATUS the status bytes
        All return pairs are mandatory unless an error has occurred
    READ            reads a series of keystrokes from the keyboard
        Parameters:
            Key
            BN      The number of the buffer where henceforth
                keycodes will be stored. 'S' will be used
                to signal "stop buffering keycodes"
            EP      Specifies options to report keypresses.
                Default behaviour is to report keypresses
                belonging to the downloaded keytable only.
                Values for this keyword are as follows:
                    KS Does not send notifications back on keys
                        presses for any key except Enter,
                        backspace and escape
                    NP Sends a notification each time a key not
                        belonging to the specified key-table
                        has been pressed
            This pair is optional.
        Returns:
            Key
            READ    the current buffer number.
    CMP     compares two the translated keycode buffers
        Parameters:
            Key
            BN1     first buffer number
            BN2     second buffer number
        Example:
            CMD=CMP BN1=0 BN2=1
        Returns:
            Key
            CMP     "1" is ther is a match. "0" no match.
        Exactly one of the two pair is acceptable.
    CLR     clears a buffers.
        Parameters:
            Key
            BN      a buffer number
        If absent all buffers are cleared.
        Example:
            CMD=CLR BN=1
        Returns:
            Key
            CLR     "OK".
    PAUSE   Suspends keyboard loopback mode.
        No input parameters.
        Returns:
            key
```

-continued

```
        PAUSE "OK".
    RESUME        Re-enters keyboard loopback mode.
        No input parameters.
        Returns:
            key
            RESUME "OK".
Error codes for EXCHANGE
```

Some error return values are defined for cases in which parameters do not comply with the protocol. So instead of the return keyvalue pairs described above, a keypair ERR=<. . . >is returned with the following values defined:

```
ERR=        Description
NOKT        No keytable is present. command cannot
            continue.
PE          In case the command is not recognized, or general
            parsing error.
NB          No buffer number has been specified in a READ
            command.
WB          An illegal buffer number has been specified.
            one or more BN=xx keypairs will specify which
            buffer number is illegal.
MB          in case of a CMP command, one buffer number has
            not been specified.
NO          The unit is not operating in Secure Pin entry mode.
Key/value Description for CONTROL
A sample transaction could be:
Host            DTU (Desk Top Unit)
"CTRL=ON"
                "KT=060021"
```

An attempt has been mad to enter Secure PIN ENtry Mode, and the unit sent back the Keytable necessary for entering a PIN.

All described parameter and return keys have a <Key>=<value> syntax.

```
CTRL=       Description and values
ON          Enter Secure PIN Entry Mode (this is also referred
            to as "loopback mode").
            Parameters:
                (none)
            Returns
                Key
                KT    Required Keytables,
                See KeytableDownloadFormat.txt
                for more information.
OFF         Exit Secure PIN Entry Mode
            Parameters:
                (none)
            Returns:
                (none)
KT          Downloads a Keytable
                Parameters:
                    Key
                    KT    a keytable specification, as described in
                                    KeytableDownloadFormat.txt
                Returns:
                    (none)
INT         Interrupts the current operation
            Parameters:
                (none)
            Returns:
                (none)
Error codes for CONTROL
```

With the exception of CTRL=ON, CONTROL messages do not use the channel to send results back, but set the return message return value as follows

```
UT_SUCCESS      Command completed ok.
UT_FAILURE      Keytable download did not succeed. Bad KT=syntax
UT_ACCESS       Could not enter Sesure PIN Mode.
UT_EIO          Cannot interrupt current operation.
                    Keytable download did not succeed.
                    not in Secure PIN entry
                    Mode
UT_NOTSUP       Wrong command
```

DM messages

```
Messages to the DM have the following DM format:
sc.props=<SCBus properties>
<SCBus properties> follow a format similar to the
key/value pairs as descrbied before, but since they are
embedded in a more general framework, values are separated
from keys by a ':' instead of '=' and pairs are
separated by '_' instead of spaces.
```

A property is always present, "sc.sn" a serial number assuming values from 0 to 255, in HexDump format.

EXAMPLE device   term=IEEE802.080020f56dc7   bus=sc addr=smartcard\sc.props=sc.sn:03_sc.kbd:060021 reports a USB type 6 keyboard, US keymap.

```
<SCBus properties>
sc.         Description
sn          Internal serial number.
kbd         Reports keyboard suitable for downloading a keytable
                via CTRL=KT. it is keyboard spec that appears
                in that control
keypress    Reports a keypress notification. Possible values are:
                '*' character belonging to the PIN has
                been pressed
                'E' ENTER has been pressed
                'Q' ESCAPE has been pressed
                'B' BACKSPACE has been pressed
                'N' a character not belonging to the PIN has
                been pressed
status      Tells SmartCard reader status. Values:
                in    a smartcard is in the reader or recognized
                out   a smartcard is not present or has
                      been removed
atr         Reports the SmartCard ATR in HexDump format
atr.hs      ATR History, HexDump format.
```

We claim:

1. A method for verifying an identification data item comprising:
    accessing a client when a user presents a form of identification;
    embedding a pattern into an APDU on said client;
    sending said pattern to a verification device;
    obtaining said identification data item by said verification device;
    constructing a prototype APDU from said APDU in said verification device using said pattern, wherein said pattern instructs said verification device to use an ASCII code versus a binary code format while constructing said prototype APDU; and
    determining if said identification data item is correct using said prototype APDU.

2. The method of claim 1 wherein said step of embedding further comprises: using a generic application.

3. The method of claim 1 wherein said client is a component of a virtual desktop system architecture.

4. The method of claim 1 wherein said form of identification is a smart card.

5. The method of claim 1 wherein said verification device is a smart card reader.

6. The method of claim 1 wherein said form of identification is a biometric identifier.

7. A method for verifying an identification data item comprising:
   accessing a client when a user presents a form of identification;
   embedding a pattern into an APDU on said client;
   sending said pattern to a verification device;
   obtaining said identification data item by said verification device;
   constructing a prototype APDU from said APDU in said verification device using said pattern, wherein said pattern instructs said verification device to use an most significant bytes first format while constructing said prototype APDU; and
   determining if said identification data item is correct using said prototype APDU.

8. A system for verifying an identification data item comprising:
   a client configured to be accessed when a user presents a form of identification;
   a pattern configured to be embedded into an APDU on said client;
   a verification device configured to receive said APDU from said client and to obtain said identification data item; and
   a prototype APDU configured to be constructed from said APDU in said verification device using said pattern to determine if said identification data item is correct, wherein said pattern instructs said verification device to use an ASCII code versus a binary code format while constructing said prototype APDU.

9. The system of claim 8 wherein said pattern is embedded using a generic application.

10. The system of claim 8 wherein said client is a component of a virtual desktop system architecture.

11. The system of claim 8 wherein said form of identification is a smart card.

12. The system of claim 8 wherein said verification device is a smart card reader.

13. The system of claim 8 wherein said form of identification is a biometric identifier.

14. A system for verifying an identification data item comprising:
   a client configured to be accessed when a user presents a form of identification;
   a pattern configured to be embedded into an APDU on said client;
   a verification device configured to receive said APDU from said client and to obtain said identification data item; and
   a prototype APDU configured to be constructed from said APDU in said verification device using said pattern to determine if said identification data item is correct, wherein said pattern instructs said verification device to use an most significant bytes first format while constructing said prototype APDU.

15. A computer program product comprising:
   a computer usable medium having computer readable program code embodied therein configured to verify an identification data item, said computer program product comprising:
   computer readable code configured to cause a computer to access a client when a user presents a form of identification;
   computer readable code configured to cause a computer to embed a pattern into an APDU on said client;
   computer readable code configured to cause a computer to send said pattern to a verification device;
   computer readable code configured to cause a computer to obtain said identification data item by said verification device;
   computer readable code configured to cause a computer to construct a prototype APDU from said APDU in said verification device using said pattern, wherein said pattern instructs said verification device to use an ASCII code versus a binary code format while constructing said prototype APDU; and
   computer readable code configured to cause a computer to present said prototype APDU to said verification device to determine if said PIN is correct.

16. The computer program product of claim 15 wherein said computer readable code configured to cause a computer to embed further comprises:
   computer readable code configured to cause a computer to embed use a generic application.

17. The computer program product of claim 15 wherein said client is a component of a virtual desktop system architecture.

18. The computer program product of claim 15 wherein said form of identification is a smart card.

19. The computer program product of claim 15 wherein said verification device is a smart card reader.

20. The computer program product of claim 15 wherein said form is a biometric identifier.

21. A computer program product comprising:
   a computer usable medium having computer readable program code embodied therein configured to verify an identification data item, said computer program product comprising:
   computer readable code configured to cause a computer to access a client when a user presents a form of identification;
   computer readable code configured to cause a computer to embed a pattern into an APDU on said client;
   computer readable code configured to cause a computer to send said pattern to a verification device;
   computer readable code configured to cause a computer to obtain said identification data item by said verification device;
   computer readable code configured to cause a computer to construct a prototype APDU from said APDU in said verification device using said pattern, wherein said pattern instructs said verification device to use an most significant bytes first format while constructing said prototype APDU; and
   computer readable code configured to cause a computer to present said prototype APDU to said verification device to determine if said PIN is correct.

* * * * *